United States Patent [19]

Vertens et al.

[11] Patent Number: 5,406,784
[45] Date of Patent: Apr. 18, 1995

[54] METHOD OF OPERATING A GAS TURBINE AND A PROCESS AND APPARATUS FOR FUEL CONTROL FOR GAS TURBINES

[75] Inventors: Peter Vertens, Löptin; Bernd Dräger, Schinkel, both of Germany

[73] Assignee: MaK System Gesellschaft mbH, Kiel, Germany

[21] Appl. No.: 157,575

[22] Filed: Nov. 23, 1993

Related U.S. Application Data

[63] Continuation-in-part of Ser. No. 132,093, Oct. 5, 1993, Pat. No. 5,369,948.

[51] Int. Cl.[6] .................................................. F02C 9/30
[52] U.S. Cl. .................................. 60/39.03; 60/39.281
[58] Field of Search .................. 60/39.03, 39.281, 734; 417/8, 45

[56] References Cited

U.S. PATENT DOCUMENTS

| | | | |
|---|---|---|---|
| 3,688,495 | 9/1972 | Fehler et al. | 60/39.281 |
| 3,946,551 | 3/1976 | Linebrink et al. | 60/39.281 |
| 4,015,426 | 4/1977 | Hobo et al. | 60/39.281 |
| 4,454,713 | 6/1984 | Meyer et al. | 60/39.281 |
| 4,808,077 | 2/1989 | Kan et al. | 417/45 |
| 4,926,629 | 5/1990 | Eick et al. | 60/39.281 |

Primary Examiner—Louis J. Casaregola
Attorney, Agent, or Firm—Nils H. Ljungman & Associates

[57] ABSTRACT

A process and apparatus for controlling flow of fuel in a gas turbine has a fuel control unit which comprises piston pumps which have at least two piston elements working in opposite phase to one another, and which can be operated in opposite phase, so that the flow of fuel to the injector nozzle is sufficiently constant. This constancy of the fuel flow is thereby a function of the delivery frequency and the number of pump piston elements operating in parallel.

20 Claims, 3 Drawing Sheets

METHOD OF OPERATING A GAS TURBINE AND A PROCESS AND APPARATUS FOR FUEL CONTROL FOR GAS TURBINES

This application is a Continuation-In-Part of U.S. application Ser. No. 08/132,093 (U.S. Pat. No. 5,369,948), entitled "A Method of Operating a Gas Turbine and a Process and Apparatus for Starting a Gas Turbine", which was filed Oct. 5, 1993 in the name of Peter Vertens, one of the inventors herein.

BACKGROUND OF THE INVENTION

1. Field of the Invention

This invention relates to gas turbines, and more particularly, to a process and an apparatus for the control of liquid fuel for gas turbines using piston pumps which transport the fuel to the fuel injector.

2. Background Information

On gas turbines, there are systems in which the fuel is injected into the combustion chamber at a uniform overpressure, where it is burned with a stationary flame. The overpressure must thereby be carefully adjusted as a function of the turbine load, the environmental conditions such as the pressure, quantity and temperature of the intake air, and the characteristics of the fuel (viscosity, ignition quality). The fuel pressure upstream of the fuel control unit must also be kept constant within strict limits.

For this purpose, feed pumps are primarily used, which feed pumps can be driven directly by the turbine. At these pumps, the injection pressure, and simultaneously the amount of fuel transported, must be adjusted by means of complex analog control mechanisms so that they correspond to the operating conditions indicated above. This system is excessively complex and expensive, in particular for small units, because the control valves used for the small amounts of fuel are expensive, and are very susceptible to fouling.

The same is true for feeding liquid fuels to other types of combustion chambers, e.g. for heating systems. In such a case, the feed for the fuel and the feed for the combustion air are generally driven by the same drive component, whereby the performance characteristics of the fan differ significantly from those of the fuel feed pump. Therefore, here again, a control system is required which includes sensitive and expensive valves which are susceptible to fouling.

OBJECT OF THE INVENTION

The object of the present invention is to create a process and an apparatus, i.e. a fuel control unit, by means of which a constant feed of fuel is assured or guaranteed in sufficient amounts to operate the gas turbine, and in which the components of the fuel control unit are also economical and substantially insensitive to the problems experienced in known systems.

SUMMARY OF THE INVENTION

The present invention teaches that this object can be achieved by activating the piston pumps by means of a pump control unit with an alternating current signal, the pulse-width of which is controlled as a function of the turbine speed and/or the pressure upstream of the injector pump. The subclaims disclose additional advantageous characterizing features of the invention.

As a result of the use of piston pumps with a stroke frequency of more than 30 Hz, in particular with at least two piston elements operating in opposite phase to one another, which are preferably designed as cam pumps, the two piston elements can be operated in opposing phases. This makes it possible to advantageously keep the fuel flow to the fuel injector sufficiently constant, whereby this constancy of the fuel flow is essentially a function of the delivery frequency, which can preferably be greater than 30 Hz, and of the number of piston elements operating simultaneously.

The length of the effective piston stroke can be controlled in a known manner by changing the valve timing by means of the cylinder geometry. Further, the use of free-floating piston pumps as the fuel pumps can be particularly advantageous, since the pistons, along with the corresponding cylinders, form a part of the fuel line, and are driven inductively by an external current coil, without the need for additional openings and gaskets in the fuel system.

The quantity of fuel can preferably be controlled by regulating the pulse-width of the current pulse flowing through the current coil. The longer the pulser the greater the amount of fuel per stroke, whereby the stroke frequency is preferably set to a constant value appropriate to the system.

Finally, it can also be advantageous to use the same pulse width controller for both pumps, to split the output signal to both pumps, and to invert or phase-shift the signal for one pump, so that when both pumps receive the signals uniformly, the pistons are operated in opposite phase.

In addition to the advantages indicated above, such as:
  simple, economical structure,
  low susceptibility to fouling,
  reliable electrical activation and control by primarily digital data processing,
  independence of the upstream fuel pressure (self-aspirated/naturally-priming),
the following additional advantages are gained:
  good ignition quality and stable flame, as a result of overlapping feed pulses of the fuel, which expands the range of optimal fuel/air ratios in the combustion chamber;
  emergency operating capability in the event of the failure of one of the two pumps,
  compensation of feed differences between the two pumps by evaluation of the pressure signals upstream of the fuel injector.

One aspect of the invention resides broadly in a process for operating a gas turbine by flow regulation of the fuel being fed to the turbine. The gas turbine comprises: a compressor, a dosing pump for feeding fuel into the gas turbine, control apparatus for controlling the dosing pump, and at least one of: a turbine speed sensor, and a pressure sensor for the fuel injection pressure. The process comprises the steps of: rotating the gas turbine at a speed of rotation; producing an alternating current signal with the control apparatus to operate the dosing pump, the alternating current signal having pulses, the pulses of alternating current having a pulse-width, and the dosing pump being operated by the pulses of the alternating current signal; pumping fuel into the turbine with the dosing pump as a function of the pulse-width of the alternating current signal; igniting the fuel; measuring at least one of: the speed of rotation of the turbine with the turbine speed sensor; and the pressure of the fuel being injected into the turbine with the pressure sensor; and adjusting the pulse width of the alternating current signal produced by the control apparatus as a function of the measured at least one of: the speed of rotation of the turbine; and the pressure of the fuel being injected into the turbine.

Another aspect of the invention resides broadly in a fuel control unit for regulating the flow of liquid fuel injected into a gas turbine, the turbine operating at a speed of revolution. The fuel control unit comprising: a dosing pump for injecting the fuel into the turbine at an injection pressure; apparatus for measuring at least one of: the speed of the turbine, and the pressure of the fuel being injected into the turbine; control apparatus for controlling operation of the dosing pump, the control apparatus configured for producing an alternating current signal to operate the dosing pump, the alternating current signal having pulses, the pulses of alternating current having a pulse-width, and the dosing pump being operated by the pulses of the alternating current signal to regulate the amount of fuel pumped by the dosing pumps; and the control apparatus comprising apparatus for adjusting the pulse width of the alternating current signal as a function of the measured at least one of: the speed of rotation of the turbine, and the pressure of the fuel being injected into the turbine, to control the operation of the dosing pump and regulate the amount of fuel being injected into the turbine.

Still another aspect of the invention resides broadly in a process for operating a gas turbine by flow regulation of the fuel being fed to the turbine, the gas turbine comprising: a compressor, a dosing pump for feeding fuel into the gas turbine, control apparatus for controlling the dosing pump, and at least one of: a turbine speed sensor, and a pressure sensor for the fuel injection pressure. The process comprises the steps of: rotating the gas turbine at a speed of rotation; producing a signal with the control apparatus to operate the dosing pump, the signal having pulses, the pulses having a pulse parameter, and the dosing pump being operated by the pulses of the signal; pumping fuel into the turbine with the dosing pump as a function of the pulse parameter of the signal; igniting the fuel; measuring at least one of: the speed of rotation of the turbine with the turbine speed sensor; and the pressure of the fuel being injected into the turbine with the pressure sensor; and adjusting the pulse parameter of the signal produced by the control apparatus as a function of the measured at least one of: the speed of rotation of the turbine; and the pressure of the fuel being injected into the turbine.

BRIEF DESCRIPTION OF THE DRAWINGS

Embodiments of the present invention are described below in greater detail and are illustrated in the accompanying drawings, in which.

DESCRIPTION OF THE PREFERRED EMBODIMENTS

Figure 1:
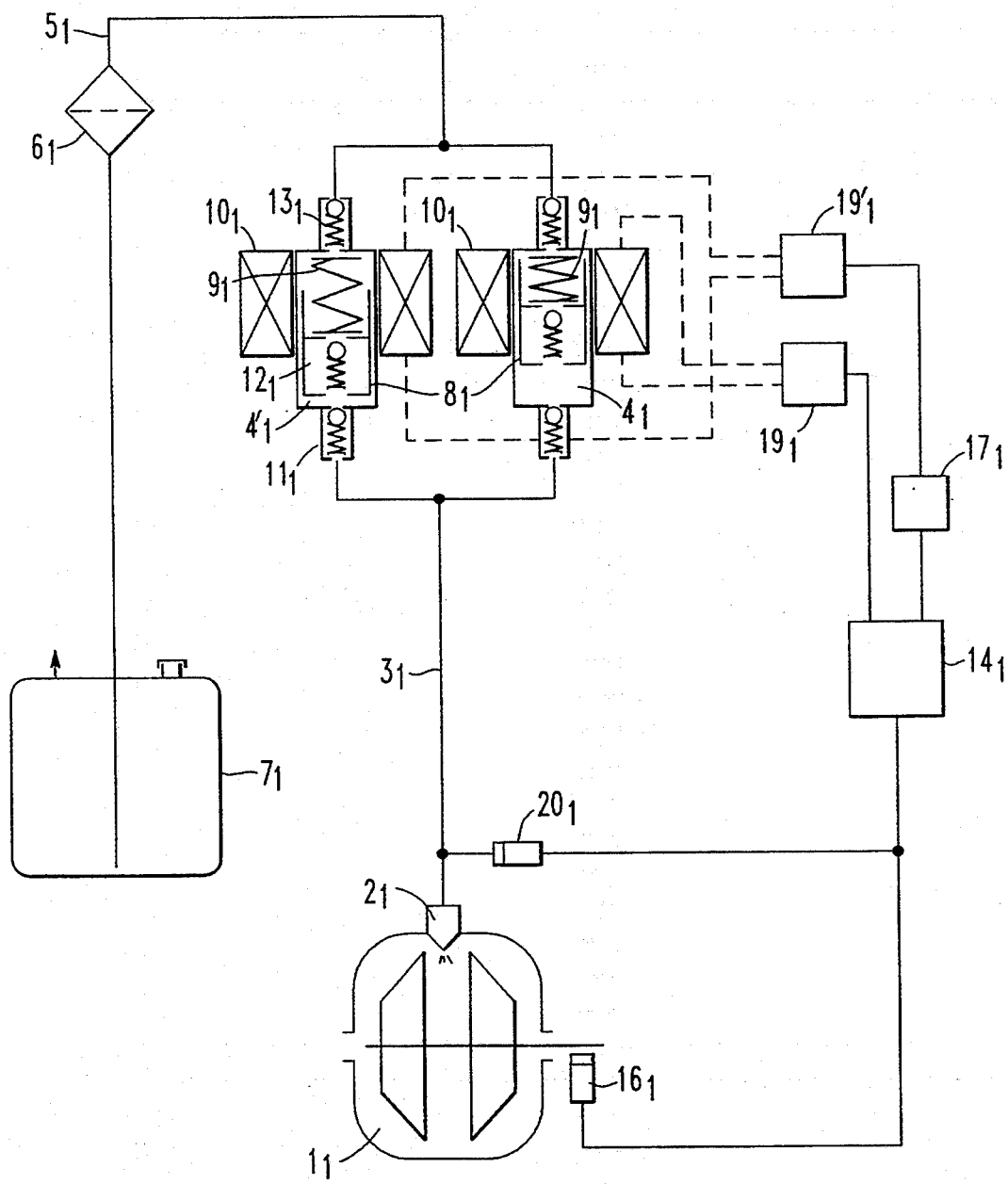
FIGS. 1 and 2 are schematic illustrations of the structure of a fuel control unit.
Figure 3:
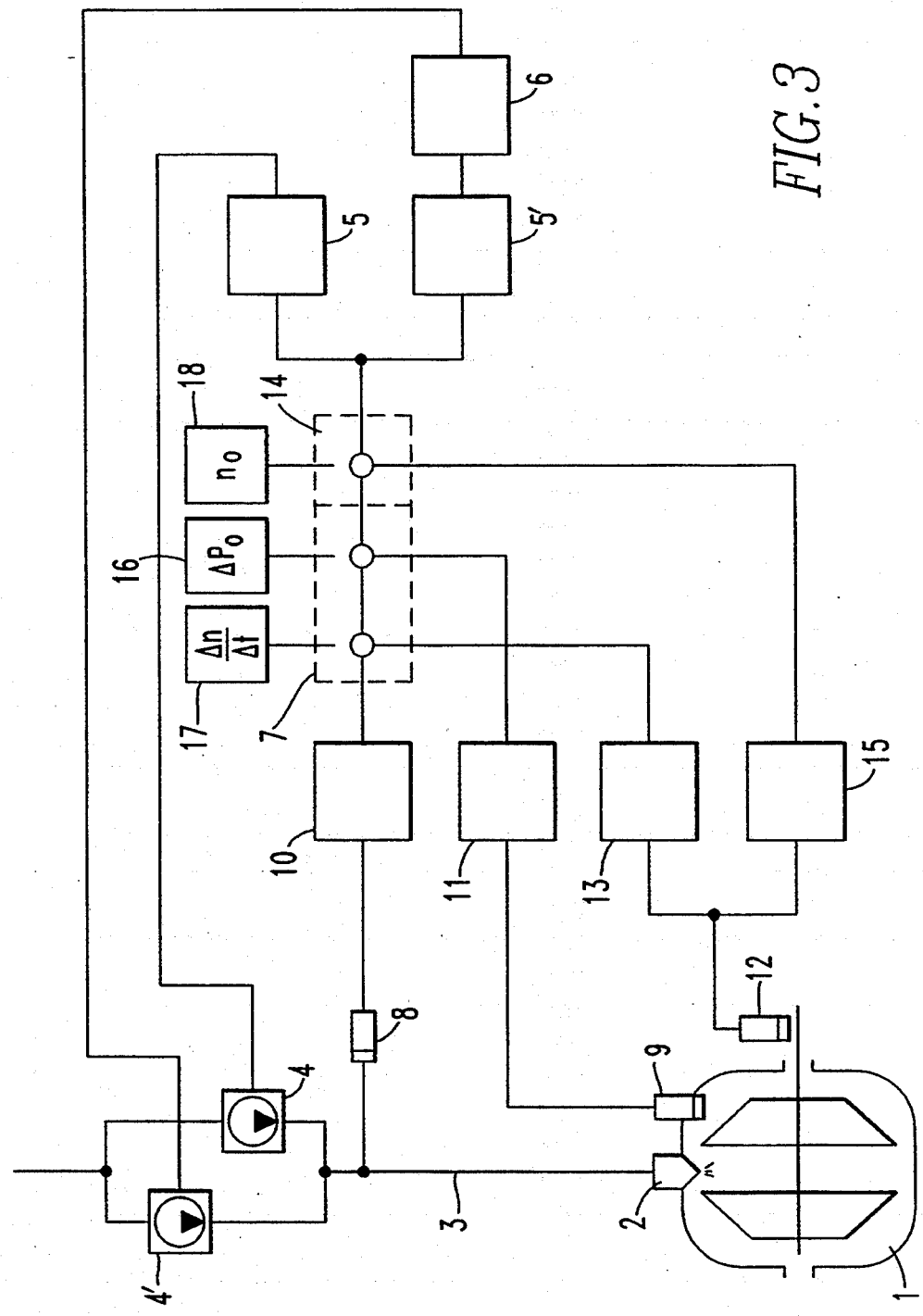
FIG. 3 shows schematically the structure of the startup controller, in connection with a speed governor.

As shown in FIG. 1, a turbine $1_1$ is supplied with fuel via a fuel injector $2_1$ and a feed line $3_1$ by piston pumps $4_1$, $4'_1$ which correspond to piston pumps 4 and 4' in FIG. 3. The fuel is taken in from a fuel tank $7_1$ via a suction line $5_1$ and a filter $6_1$, whereby no additional pre-feed pump is necessary, as long as the suction head does not exceed the physically allowable suction head. In this regard, it can be preferable that the fuel tank be disposed nearly as vertically close to the pumps $4_1$ and $4'_1$ as possible, to avoid an excessive suction head.

The piston pumps $4_1$, $4'_1$, as shown in the figures, can preferably be free-floating piston pumps with pistons $8_1$ and feed springs $9_1$, as well as drive magnets $10_1$. The piston pumps $4_1$ and $4'_1$ preferably have free-floating valving structures therein. The automatic non-return valves $11_1$ to $13_1$ can be used to substantially assure or guarantee the correct delivery of the fuel.

The pumps $4_1$, $4'_1$ are preferably activated by means of a pump control unit (pulse-width controller) $14_1$ with an alternating current signal $15_1$ (FIG. 2), the pulse-width of which can preferably be controlled by the load of the turbine, which can be interpreted, for example, on the basis of the turbine speed (sensor or transducer $16_1$) or the pressure upstream of the fuel injector $2_1$ (pressure sensor or transducer $20_1$). Both the positive portions of the pulse at $15_1$ (FIG. 2), and both positive and negative portions of the pulse at $15'_1$ (FIG. 2A) can be used.

The present invention teaches that the output signal from the one control unit $14_1$ can be inverted ($15_1$) in a phase-shifter $17_1$, and after the phase shifting ($15'_1$), the signals $15_1$ and $15'_1$ can preferably be amplified in power stages $19_1$, $19'_1$.

Figure 2:
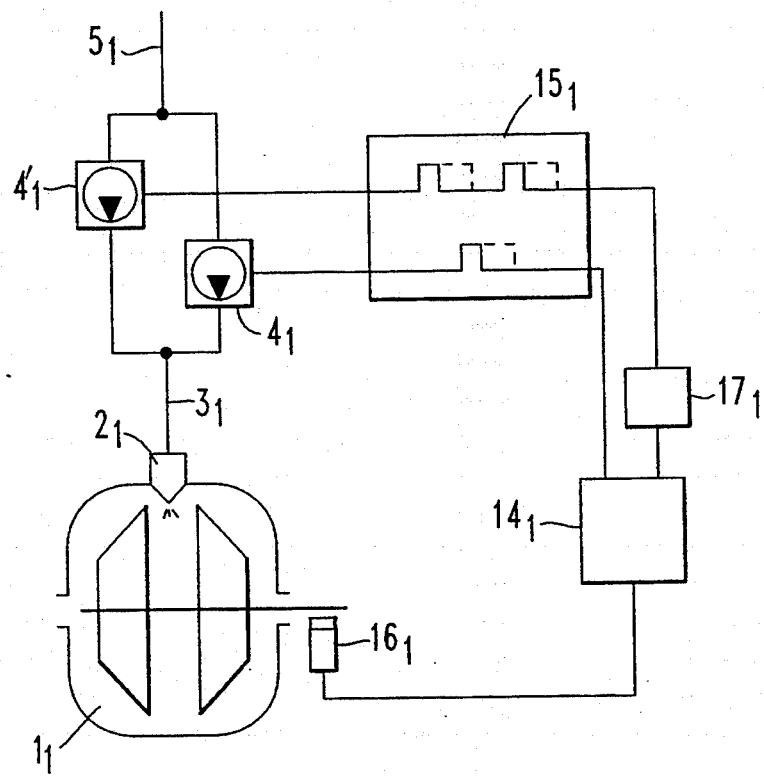
Figure 2A:
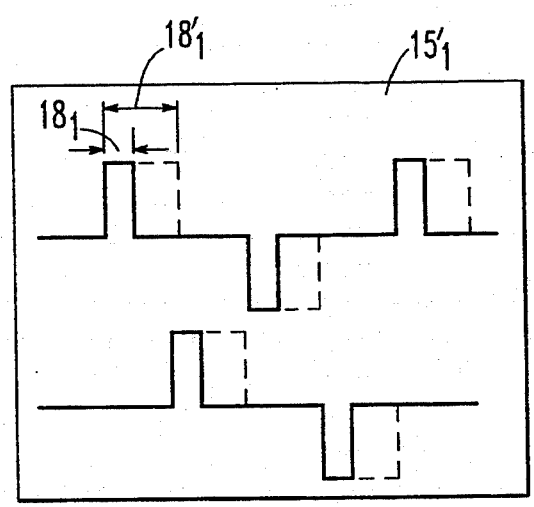
FIG. 2A depicts one representation of an alternating current signal for operating the fuel control unit.

However, the use of a single control unit $14_1$ for both pumps has been found to be advantageous, as shown in FIGS. 1 and 2, whereby downstream of the control unit, the signal can be split and inverted or phase-shifted for one pump $4'_1$.

Alternatively, in another embodiment, the pumps $4_1$, $4'_1$ could be modified to act as free-floating valves and an additional pump in line 5 could provide pressure for the fuel.

Additional pumps could be connected in parallel to a pump control unit (pulse-width controller) 14 and phase-shifter 17 to shift the signals by a corresponding angle such that if three pumps are present the signals would preferably be phase shifted from one another by 120°, if four pumps were provided the signal would preferably be shifted from one another by 90°, if five pumps were provided the signal would preferably be shifted from one another by 72°, and if six pumps were provided the signal would preferably be shifted from one another by 60°.

These signals could be generated by digital circuitry to provide the appropriate phase shifts between signals feeding each piston pump.

The increase in the number of piston pumps over one piston pump improves the performance and control of the fuel supply system and thus the performance of the gas turbine $1_1$.

Some examples of pressure and other sensors and transducers may be found in U.S. Pat. No. 4,598,541, which issued Jul. 8, 1986, entitled: Hot Gas Generator, invented by Mori-Hiromitsu, Akagi-Kosuke and Kitahata-Hiroki; U.S. Pat. No. 4,271,859, which issued Jun. 9, 1981, entitled: Temperature Sensor, invented by Joseph W. Lawsing; U.S. Pat. No. 3,943,704, which issued Mar. 16, 1976, entitled: Temperature Control Device Before The Turbine Of A Gas-Turbine Power Unit, invented by Isaak Semenovich Ratner; and U.S. Pat. No. 3,918,254, which issued Nov. 11, 1975, entitled: Fuel Control For A Gas Turbine Having Auxiliary Air Bleed, invented by Donald E. Wernberg.

Some examples of speed and other sensors and transducers may be found in U.S. Pat. No. 5,103,636, which issued Apr. 14, 1992, entitled: Continuous Flow Fuel Control System, invented by Michael J. Bak; U.S. Pat. No. 5,080,496, entitled: Method And Apparatus For Compensated Temperature Prediction, invented by William J. Keim and Michael S. Idelchik; and U.S. Pat. No. 5,067,355, which issued Nov. 26, 1991, entitled: Shaft Torque Measurement, invented by James R. Witte.

Some examples of free-floating pumping and valving structures may be found in U.S. Pat. No. 5,215,117, which issued Jun. 1, 1993, entitled: Double-Check Filler Valve, invented by James A. Petersen, Herbert L. Flanigan, and David F. Zeiss; and U.S. Pat. No. 5,018,432, which issued May 28, 1991, entitled: Hydrostatic Steering Device With A Radially Free Floating Valve Member, invented by Hollis N. White, Jr.; U.S. Pat. No. 5,161,779, which issued Nov. 10, 1992, entitled: Magnet System, invented by Juergen Graner, Guenther Bantleon, Hans Kubach and Marcel Kirchner; and U.S. Pat. No. 4,979,955, which issued Dec. 25, 1990, invented by Robert M. Smith.

Other types of free-floating pumps which could be used within the context of the present invention are the ET ETK ETU ETS oscillating piston pumps manufactured by Eckerle Elektronik GmbH. Such pumps are capable of operating at currents of about 50 Hz to about 60 Hz.

In the context of the present invention, it can be obvious to one knowledgeable with such piston pumps that such pumps, because of the operating frequency may not be capable of completing a full piston stroke before a next electrical pulse arrives, again triggering another stroke. The piston strokes, as such, would therefore essentially be only partial strokes, and under operating conditions it may be conceivable that a pump piston may never essentially achieve a full base-line position, or a full extended position, but may appear to vibrate, therebetween.

One feature of an invention resides broadly in the process for regulating the flow of liquid fuel for gas turbines, using piston pumps which transport the fuel to the fuel injector, characterized by the fact that the piston pumps $4_1$, $4'_1$ are activated by a-pump control unit $14_1$ with an alternating current signal $15_1$, $15'_1$, the pulse-width $18_1$, $18'_1$ of which is controlled as a function of the turbine speed and/or the pressure upstream of the injector pump $2_1$.

Another feature of an invention resides broadly in the process, characterized by the fact that the drive signal $15_1$, $15'_1$ from the controller $14_1$ is inverted or phase-shifted in a phase shifter $17_1$, and is amplified in power stages $19_1$, $19'_1$.

Yet another feature of an invention resides broadly in the fuel control unit, characterized by the fact that both pumps $4_1$, $4'_1$ are driven by the same pulse-width control unit $14_1$, whereby for one of the two pumps $4_1$, $4'_1$, the drive signal $15_1$, $15'_1$ is inverted or phase-shifted.

Still another feature of an invention resides broadly in the fuel control unit, characterized by the fact that the stroke frequency of the piston pumps $4_1$, $4'_1$ is greater than 30 Hz.

Another feature of an invention resides broadly in the fuel control unit, characterized by the fact that at least two piston elements of the pumps $4_1$, $4'_1$ act on the same fuel injector $2_1$ in opposite phase to one another, whereby the piston elements are preferably driven in opposite phase to one another.

Yet another feature of an invention resides broadly in the fuel control unit, characterized by the fact that the length of the effective piston stroke of the pumps $4_1$, $4'_1$ can be modified.

Still yet another feature of an invention resides broadly in the fuel control unit, characterized by the fact that the fuel pumps $4_1$, $4'_1$ consist of electrical, inductively-driven, free-floating piston pumps, the stroke of which is controlled by changing the pulse-width $18_1$, $18'_1$ of the electric drive pulse $15_1$, $15'_1$.

Another embodiment of the present invention regards a process for starting and operating a gas turbine by means of a startup controller, the gas turbine comprising: a compressor, a turbine speed sensor, a speed governor, a pressure sensor for the fuel injection pressure, a compressor pressure sensor, and dosing pump for feeding fuel into the gas turbine. The process can preferably comprise the steps of: feeding signals from a turbine speed sensor, a speed governor, a pressure sensor for the injection pressure, and a compressor pressure sensor of the turbine; processing the signals relating to speed and pressure; controlling an amount of fuel, in a first stage of starting, by controlling the dosing pumps so that a specified difference is achieved between a pressure within the compressor of the gas turbine and the injection pressure of fuel to the gas turbine; sensing an ignition criterion in the gas turbine; increasing, in a second stage of starting, after the ignition criterion has been fulfilled, the amount of fuel so that the turbine speed reaches the rated speed in a specified period of time; transferring, in a third control stage, the turbine control to a speed governor for running the turbine at a substantially constant rate of speed; and maintaining the turbine at a substantially constant speed substantially independent of load.

Yet another embodiment of the present invention regards a process which further includes regulating an amount of fuel injected into the turbine as a function of the difference between the injection pressure of the fuel and the compressor pressure in at least one of: the combustion chamber and at the compressor outlet. The step of regulating can preferably be performed by the control circuit.

As shown in FIG. 3, a turbine 1 can preferably be fed with fuel by means of an injector nozzle 2 and a fuel line 3 from dosing pumps 4, 4' operating in parallel. The pumps 4, 4' can be powered by electrical power supply units 5 and 5', e.g. with pulsewidth-modulated currents, which drive them so that they operate as dosing pumps. The two pumps 4, 4', as discused previously, can preferably be designed as piston pumps and are preferably operated in opposite phase to one another to limit the delivery pressure pulsations. This type of operation is achieved by a phase shifter 6 for the signal to the one pump 4'.

The startup controller 7 preferably receives the signals from the pressure sensors 8 and 9 for the injection pressure and for the compressor pressure, which can preferably be processed in electronic units 10 and 11. Moreover, the startup controller 7 receives the signal from the turbine speed sensor 12, which can be processed in an additional electronic unit. The downstream speed governor 14, which also receives the signal from the speed sensor 12 via the electronic unit 15, is typically not active during the starting phase.

The starting process can take place as follows, for example:

A starter (not shown) is used to run up the turbine 1. When a defined compressor pressure is reached, the startup controller 7 puts the dosing pumps 4, 4' in operation, and controls them so that the pressure differential at the sensor 8 (injection pressure) and 9 (compressor pressure) is approximately equal to the specified pressure 16 (delta $P_o$). Ignition occurs. The turbine speed is accelerated, increases and exceeds a specified speed gradient 17, as an indication that ignition has occurred. Thus the startup controller 7 switches to the speed signal, and by corresponding dosing of the fuel, increases the speed along a specified speed gradient 17 to the rated speed 18 ($n_o$). Shortly before the rated speed 18 is reached, the speed governor 14 takes over the fuel regulation, and keeps the turbine 1 at the specified rated speed 18, independently of the load. The startup controller 7 with the corresponding sensors remains active during the phase of rated operation, and monitors the turbine 1, e.g. with regard to unacceptable pressures, speeds and combinations.

The startup controller 7 in various embodiments may be analog circuits, or an analog computer or alternatively a digital computer with appropriate analog-to-digital and/or digital-to-digital transducers and/or conversion circuitry. The various circuits in the controller 7 include scaling circuits, clock circuits and memory circuits, among others.

Some examples of small gas turbines in which some embodiments of the present invention and an invention described below could be utilized are U.S. Pat. No. 5,207,054, which issued May 4, 1993, entitled: Small Diameter Gas Turbine Engine, invented by Colin Rodgers, Jack R. Shekleton and Anthony C. Jones; U.S. Pat. No. 5,131,782, which issued Jul. 21, 1992, entitled: Shaft Coupling For Gas Turbine Engine, invented by Vittorio Bruni and Edwin C. Tetsull; U.S. Pat. No. 4,086,760, which issued May 2, 1978, entitled: Gas Turbine, invented by Richard Chute; U.S. Pat. No. 4,000,609, which issued Jan. 4, 1977, entitled: Radial Flow Gas Turbine Engine With Annular Combustor Liner, invented by Richard Chute; and U.S. Pat. No. 5,115,638, which issued May 26, 1992, entitled: Propulsion Turbine Fuel control System, invented by Wendell E. Reed and Malcolm J. McArthur.

Some examples of control gas turbines in which some embodiments of the present invention and an invention described below could be utilized are U.S. Pat. No. 4,464,895, which issued Aug. 14, 1984, entitled: Gas Turbine Engine Starting Technique and Control, invented by Terry Morrison and Jay D. Meador; U.S. Pat. No. 4,274,255, which issued Jun. 23, 1981, entitled: Control For Start-up of a Gas Turbine Engine, invented by Robert R. Pollak; U.S. Pat. No. 4,019,315, which issued Apr. 26, 1977, entitled: Gas Turbine Power Plant Control Apparatus Including A Temperature Reset Starting Control System and an Ignition Pressure Control System, invented by Robert A. Yannone and James J. Shields; and U.S. Pat. No. 3,902,315, which issued Sep. 2, 1975, entitled: Starting Fuel Control System For Gas Turbine Engines, invented by Anthony N. Martin.

One feature of the invention resides broadly in the process for starting a gas turbine by means of a startup controller which is located in an electronic control circuit with a turbine speed sensor, a speed governor and a pressure sensor for the injection and compressor pressure, as well as dosing pumps, and in which signals concerning the speed and pressure can be processed in electronic units, characterized by the fact that in a first control stage, the amount of fuel is controlled by means of the dosing pumps so that a specified difference is achieved between the compressor pressure and the injection pressure, and in a second pressure stage, after an ignition criterion has been fulfilled, the amount of fuel is increased so that the turbine speed reaches the rated speed in a specified period of time, and in a third control stage, the turbine control is taken over by the speed governor, and the turbine is kept at a constant speed independently of the load.

Another feature of the invention resides broadly in the process, characterized by the fact that the amount of fuel injected is regulated as a function of the difference between the injection pressure and the compressor pressure in the combustion chamber or at the compressor outlet in the electrical control circuit.

Still another feature of the invention resides broadly in the process, characterized by the fact that in a run-up phase, the turbine and the turbine speed are monitored by means of a sensor, and by appropriate dosing of the amount of fuel, the turbine is run up to the rated speed (no). in a specified time (t).

Yet another feature of the invention resides broadly in the process, characterized by the fact that in steady-state normal operation, the fuel feed is regulated by the speed governor to maintain a constant speed, and the difference between the injection pressure and the compression pressure, as well as the speed changes, are monitored by means of the startup controller, and when critical or unacceptable values are reached, a warning signal is emitted or a safe shutdown is performed.

Still yet another feature of the invention resides broadly in the device for the performance of the process, characterized by the fact that the startup controller 7 in the electrical circuit receives signals from the pressure sensor 8, 9 for the injection pressure and the compressor pressure, and the signal from the speed sensor 12, the signals from the pressure sensors 8, 9 are processed in the electronic units 10, 11, and the signal from the speed sensor 12 is processed in the electronic unit 13.

Another feature of the invention resides broadly in the startup controller, characterized by the fact that as the dosing pumps 4, 4' at least two pulsewidth-modulated piston pumps are used, which are pulsed in opposite phase to one another.

A further aspect of an invention described below relates to a process and an apparatus for the control of liquid fuel for gas turbines using piston pumps which transport the fuel to the fuel injector which can be used with the gas turbine system as described above.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 42 21 804, filed on Jul. 3, 1992, having inventors Peter Vertens and Bernd Dräger, and DE-OS P 42 21 804 and DE-PS P 42 21 804, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Other foreign patent publication applications, namely, Federal Republic of Germany Patent Application No. P 42 21 805, filed on Jul. 3, 1992, having inventors Peter Vertens and Bernd Dräger, and. DE-OS P 42 21 805 and DE-PS P 42 21 805, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's , option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Process for operating a gas turbine by flow regulation of the fuel being fed to the turbine, the gas turbine comprising: a compressor; dosing pump means for both pumping fuel into the gas turbine and regulating a volume of fuel being pumped; said dosing pump means comprising at least first and second piston pumps; said first and second piston pumps being disposed in parallel; said first and second piston pumps each comprising a reciprocating piston, each reciprocating piston being disposed to reciprocate in a back-and-forth piston stroke for pumping fuel; each of said first and second piston pumps further comprising check valve means for providing a substantially one-directional flow of fuel through said first and second piston pumps; said gas turbine further comprises control means for controlling operation of said dosing pump means; said control means comprising means for operating said pistons of said first and second piston pumps in substantially opposite phase to one another; and said gas turbine further comprises at least one of: a turbine speed sensor, and a pressure sensor for determining the fuel injection pressure; the process comprising the steps of:
   rotating the gas turbine at a speed of rotation;
   producing an alternating current signal with said control means to operate said pistons of said first and second piston pumps in opposite phase to one another, the alternating current signal having pulses, the pulses of the alternating current signal having a pulse-width;
   operating said pistons of said first and second piston pumps in substantially opposite phase to one another by the pulses of the alternating current signal to reciprocate said pistons in said back-and-forth piston stroke;
   pumping a volume of the fuel into the turbine with said back and forth piston stroke as a function of the pulse-width of the alternating current signal;
   operating said check valve means to maintain a substantially one-directional flow of fuel through said first and second piston pumps;
   igniting the fuel;
   measuring at least one of:
   the speed of rotation of the turbine with the turbine speed sensor; and
   the pressure of the fuel being injected into the turbine with said pressure sensor; and
   adjusting the pulse width of the alternating current signal produced by said control means as a function of said measured at least one of:
   the speed of rotation of the turbine; and
   the pressure of the fuel being injected into the turbine;
   to adjust the back and forth piston stroke and adjust the volume of fuel being pumped into the turbine by the back and forth piston stroke.

2. The process according to claim 1, further including operating said pistons of said first and second piston pumps at a constant stroke frequency.

3. The process according to claim 2, further including:
   providing an alternating current signal for each of said first and second piston pumps with a single pump control means;
   phase-shifting the alternating current signal for one of said first and second piston pumps to operate said pistons of said first and second piston pumps in substantially opposite phase;
   amplifying said alternating current signals for each of said first and second piston pumps; and
   operating said pistons of said first and second piston pumps at a back and forth stroke frequency of greater than 30 Hz.

4. The process according to claim 3, further including:
   phase-shifting the alternating current signal for said one of said first and second piston pumps by 180° with respect to the alternating current signal for the other of said first and second piston pumps; and
   operating said first and second piston pumps in the substantially opposite stroke relationship to alternate the back and forth piston strokes of said first and second piston pumps to supply a substantially constant flow of fuel to the turbine.

5. The method according to claim 4, wherein said back and forth piston strokes have a length, and said method further comprises changing the length of said beck and forth piston strokes to alter the supply of fuel to the turbine.

6. The process according to claim 5, further comprising the steps of:
   increasing the pulse width of the alternating current signal to increase the length of said back and forth piston strokes of said first and second piston pumps to increase the volume of fuel being pumped into the turbine by the back and forth piston strokes of said first and second piston pumps; and
   decreasing the pulse width of the alternating current signal to decrease the length of said back and forth piston strokes of said first and second piston pumps to decrease the volume of fuel being pumped into the turbine by the back and forth piston strokes of said first and second piston pumps.

7. The method according to claim 6, wherein each of said first and second piston pumps comprise electrically operated, inductively-driven, free-floating piston pumps having a back and forth piston stroke controllable by changing the pulse-width of the alternating current signal.

8. The method according to claim 7, wherein: said first and second piston pumps comprises sole pumps for pumping fuel to said gas turbine and simultaneously metering the amount of fuel being pumped; each of said first and second piston pumps comprises an input and an output, end each of said input and said output comprising at least one check valve means for providing substantially one-directional flow of said fuel through said first and second piston pumps from said input through said output thereof, and said method further comprises:

pumping fuel solely with said first and second piston pumps to said gas turbine; and during said pumping, flowing fuel through said first and second piston pumps from an input of said first and second pump means, through said at least one check valve of said input, through said first and second piston pumps, through said at least one check valve of said output, and out of said output of said first and second piston pumps.

9. A fuel control unit for regulating the flow of liquid fuel injected into a gas turbine, the gas turbine operating at a speed of revolution, said fuel control unit comprising:

piston pump means for pumping fuel from a fuel storage container and injecting the fuel into the gas turbine at an injection pressure, said piston pump means comprising a sole means for pumping the fuel and simultaneously adjusting the volume of fuel being pumped from the fuel storage container to the gas turbine;

said piston pump means comprising:

piston means, said piston means comprising at least one piston being moveable in a back and forth reciprocating movement to define a piston stroke, said piston means comprising the sole means for both pumping fuel and adjusting the flow of the fuel into the gas turbine;

non-return valve means, said non-return valve means comprising at least one non-return valve for providing a one-directional flow of fuel through said piston pump means; and each of said at least one piston having a corresponding non-return valve; means for measuring at least one of:

the speed of the turbine, and the pressure of the fuel being injected into the turbine;

control means for controlling operation of said piston pump means, said control means comprising means for producing an alternating current signal to operate said piston pump means, the alternating current signal having pulses, the pulses of the alternating current signal having a pulse-width, said piston means being movable in said back and forth stroke by a pulse of the alternating current signal to pump a volume of fuel; and said control means comprising means for adjusting the pulse width of the alternating current signal as a function of said measured at least one of:

the speed of rotation of the turbine, and the pressure of the fuel being injected into the turbine, to control the back and forth stroke of said piston means and regulate the amount of fuel being pumped into the turbine.

10. The fuel control unit according to claim 9, further including:

each said at least one non-return valve comprising a check valve;

said piston stroke of said piston means being dependent upon the pulse width of said alternating current signal, said piston stroke being longer with increased pulse width; and said piston stroke being shorter with decreased pulse width; and said means for adjusting comprising:

means for increasing the pulse width to increase the piston stroke and increase the amount of fuel being pumped by said piston means; and means for decreasing the pulse width to decrease the piston stroke and decrease the amount of fuel being injected.

11. The fuel control unit according to claim 10, further including:

said piston pump means being configured for being operated at a constant stroke frequency;

said piston pump means comprising at least two piston pumps connected in parallel;

said at least two piston pumps comprising free-floating piston pumps;

said control means further comprises a single pump control means configured for providing alternating current signals for each of said at least two piston pumps; and said apparatus further comprises phase-shifting means for phase-shifting the alternating current signal for at least one of said at least two piston pumps to operate said at least two piston pumps in an out of phase relationship to provide a substantially constant flow to the gas turbine.

12. The fuel control unit according to claim 11, wherein:

said apparatus further includes means for amplifying said alternating current signals for each of said at least two piston pumps;

said at least two piston pumps are configured to operate at a stroke frequency of greater than 30 Hz; and said phase-shifting means is configured for phase-shifting the alternating current signal for at least one of said at least two piston pumps by 180° with respect to the alternating current signal for another of said at least two piston pumps to operate said at least two piston pumps in a substantially opposite stroke relationship with respect to one another to alternate the piston strokes of said at least two piston pumps to substantially continuously supply fuel to the turbine.

13. The fuel control unit according to claim 12, wherein:

each of said at least two piston pumps comprises an electrically operated, inductively-driven, free-floating piston pump having a piston stroke controllable by changing the pulse-width of the alternating current signal; and each of said at least two piston pumps comprises:

an input;

an output;

at least first check valve means disposed at said input; and at least second check valve means disposed at said output.

14. A process for operating a gas turbine by flow regulation of the fuel being fed to the turbine, the gas turbine comprising: a compressor; piston pump means, said piston pump means comprising at least one piston for pumping fuel into and simultaneously regulating a volume of fuel being pumped into the gas turbine, said piston pump means comprising sole means for pumping fuel into the gas turbine and simultaneously metering the amount of fuel being pumped; control means for controlling operation of the piston pump means; and at least one of: a turbine speed sensor, and a pressure sensor for the fuel injection pressure, the process comprising the steps of:

rotating the gas turbine at a speed of rotation;

producing a signal with said control means to operate said at least one piston, the signal having pulses, said pulses having a pulse parameter, and said at least one piston being operated by the pulses of the signal;

pumping fuel and simultaneously adjusting a volume of fuel being pumped from a fuel storage container and into the gas turbine solely with said at least one piston as a function of the pulse parameter of the signal;

igniting the fuel;

measuring at least one of:
the speed of rotation of the turbine with the turbine speed sensor; and
the pressure of the fuel being injected into the turbine with said pressure sensor;

adjusting the pulse parameter of the signal produced by said control means as a function of said measured at least one of:
the speed of rotation of the turbine, and
the pressure of the fuel being injected into the turbine, to adjust an amount of fuel being pumped by said at least one piston into the turbine.

15. The process according to claim 14, further including said at least one piston having a piston stroke for simultaneously pumping and metering a volume of fuel being pumped into the turbine, said piston stroke being dependent upon the pulse parameter of said signal, each said at least one piston comprising a corresponding non-return valve means for providing one-directional flow of fuel through said piston pump means; and
said process further comprises:
during said pumping of fuel, providing one-directional flow of fuel through said piston pump means;
increasing the pulse parameter to increase said piston stroke and increase the amount of fuel being injected into the turbine; and
decreasing the pulse parameter to decrease said piston stroke and decrease the amount of fuel being injected into the turbine.

16. The process according to claim 15, further including:
said piston pump means comprising at least two piston pumps connected in parallel, said at least two piston pumps comprising sole means for pumping fuel from the fuel storage container into said gas turbine;
providing signals for each of said at least two piston pumps with a single pump control means; and
phase-shifting the signal for at least one of said at least two piston pumps to operate said et least two piston pumps in an out of phase relationship.

17. The process according to claim 16, further including:
amplifying said signals for each of said at least two piston pumps; and
operating said at least two piston pumps at a substantially constant stroke frequency, said stroke frequency being greater than 30 Hz.

18. The process according to claim 17, further including:
phase-shifting the signal for at least one of said at least two piston pumps by 180° with respect to the signal for another of said at least two piston pumps; and
operating said at least two piston pumps in a substantially opposite stroke relationship to alternate the piston strokes of said at least two piston pumps to substantially continuously supply fuel to the turbine at a substantially constant flow to the turbine.

19. The process according to claim 18, wherein said step of operating said at least two piston pumps comprises operating said at least two piston pumps in an opposite stroke relationship to alternate the piston strokes of said at least two piston pumps to continuously supply fuel to the turbine at a constant flow to the turbine.

20. The process according to claim 19, wherein:
said at least two piston pumps comprises two piston pumps;
said piston strokes have a length;
said method further comprises changing the length of said piston strokes to alter the supply of fuel to the turbine;
said pulse parameter comprises a pulse width;
said signal comprises an alternating current signal; and
each of said two piston pumps comprise electrically operated, inductively-driven, free-floating piston pumps having a piston stroke controllable by changing the pulse-width of the alternating current signal.

* * * * *